Figure 2:
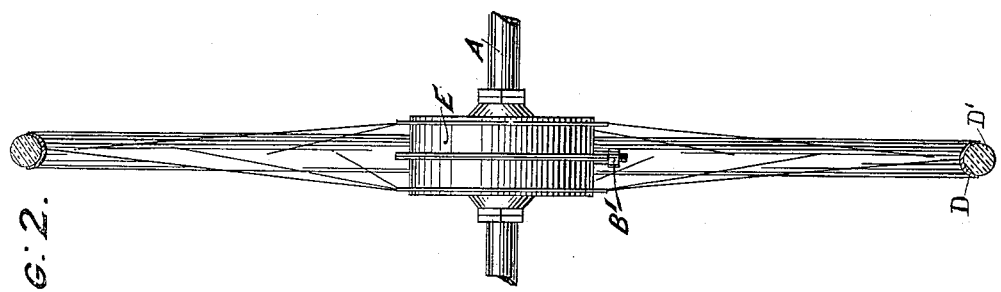

No. 670,310. Patented Mar. 19, 1901.
T. COAD.
PNEUMATIC HUB FOR WHEELS.
(Application filed Aug. 11, 1900.)
(No Model.) 3 Sheets—Sheet 1.

Witnesses: Inventor:
John Chalmers Wilson Theophilus Coad,
Percy E. Bowen by Philipp uss & Fisher
Attorneys.

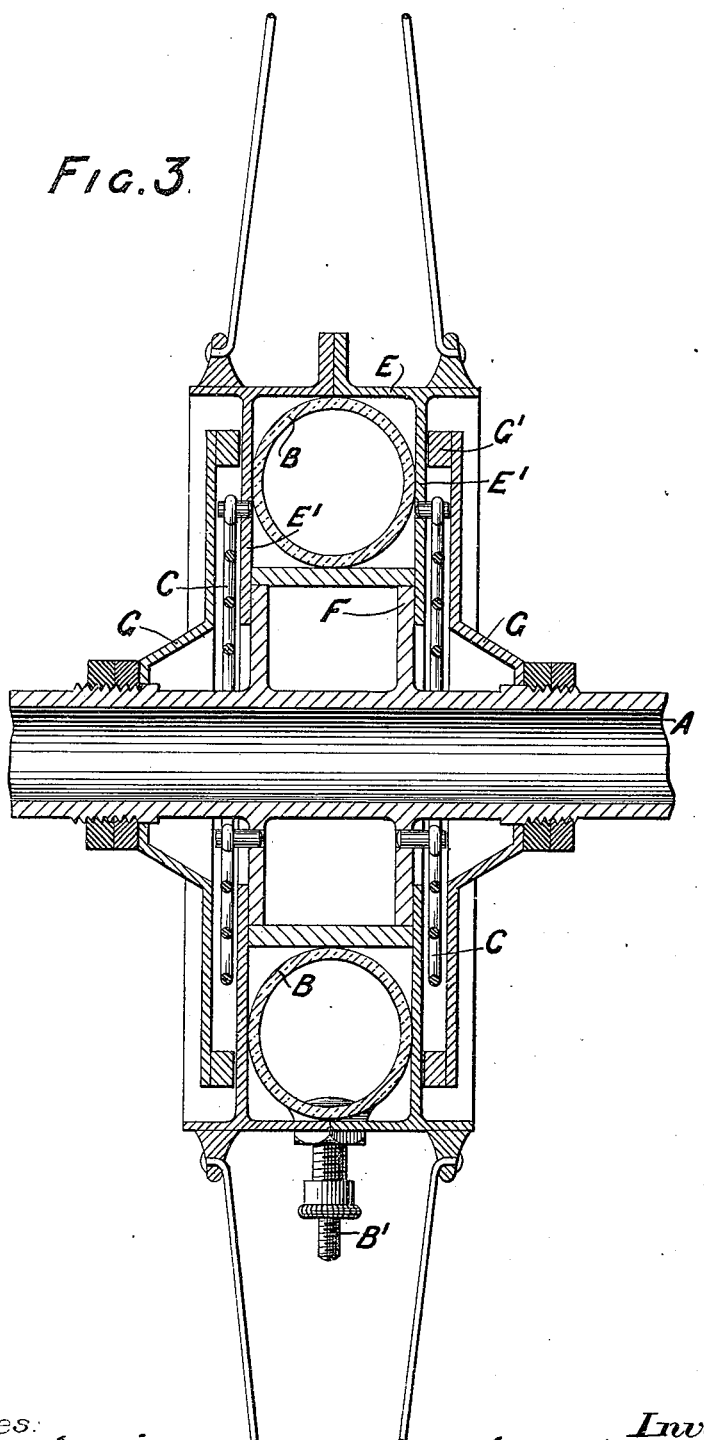

No. 670,310. Patented Mar. 19, 1901.
T. COAD.
PNEUMATIC HUB FOR WHEELS.
(Application filed Aug. 11, 1900.)
(No Model.) 3 Sheets—Sheet 3.

Witnesses:

Inventor
Theophilus Coad
by Wilkinson & Fisher
Attorneys.

UNITED STATES PATENT OFFICE.

THEOPHILUS COAD, OF LONDON, ENGLAND.

PNEUMATIC HUB FOR WHEELS.

SPECIFICATION forming part of Letters Patent No. 670,310, dated March 19, 1901.

Application filed August 11, 1900. Serial No. 26,642. (No model.)

*To all whom it may concern:*

Be it known that I, THEOPHILUS COAD, a subject of the Queen of Great Britain, residing at London, in the county of Middlesex, England, have invented certain new and useful Improvements in Pneumatic Hubs for Wheels; and I do hereby declare the following to be a full, clear, and exact description of the invention, such as will enable others skilled in the art to which it appertains to make and use the same.

Numerous attempts have been made to produce a wheel in which some elastic device is interposed between the wheel-axle and the road in order to insulate the axle from the vibrations produced by the inequalities of the road-surface. Such devices have hitherto not been attended with complete success. When air-inflated tires have been placed upon the wheel-rims to run in contact with the road, they have not been reliable in that they may become punctured and so rendered useless, and therefore such tires are impracticable in circumstances where a breakdown might be dangerous to life or to the success of the undertaking in hand. All this has been thoroughly appreciated by those who have studied the question, and inventors, many of them with little practical knowledge, have proposed to insert a vast number of springs between a solid road-tire and the hub of the wheel; but this means is faulty from the wear and damage incident to the employment of such a considerable number of small delicate parts. Other inventors have proposed inserting an air-inflated flexible tube between an inner rim and the road-tire; but this involves liability of damage to the inflated tube and presents a most difficult problem in finding means by which relative circumferential motion can be controlled between the road-tire and the body of the wheel proper. Now by this invention the before-mentioned difficulties have been entirely overcome and there is produced a wheel where vibration is insulated from the axle by an inflated flexible tube, which tube is entirely incased in metal, and therefore not at all liable to become injured, while relative circumferential motion between the two parts of the wheel which are separated by the annular inflated tube is elastically controlled by two spiral metal springs which are also inclosed and protected as hereinafter described.

Figure 1:
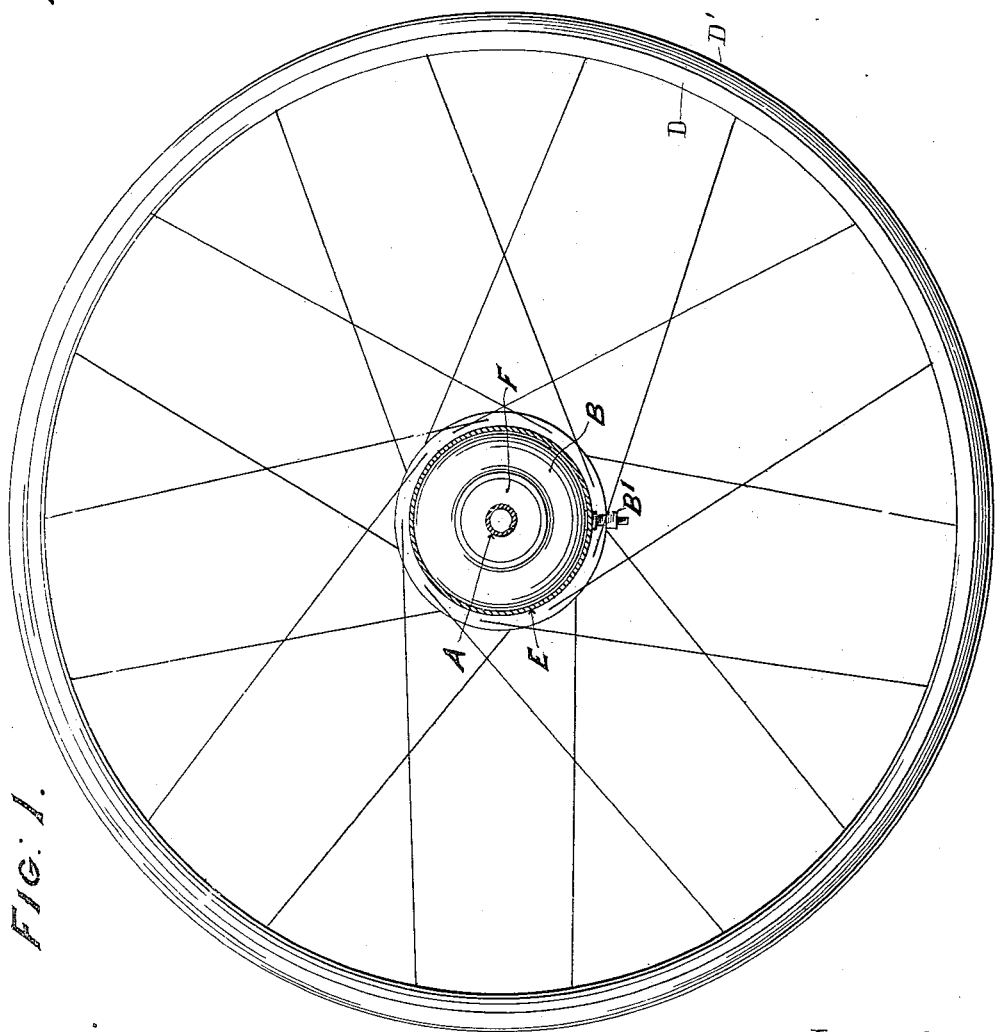
Figure 4:
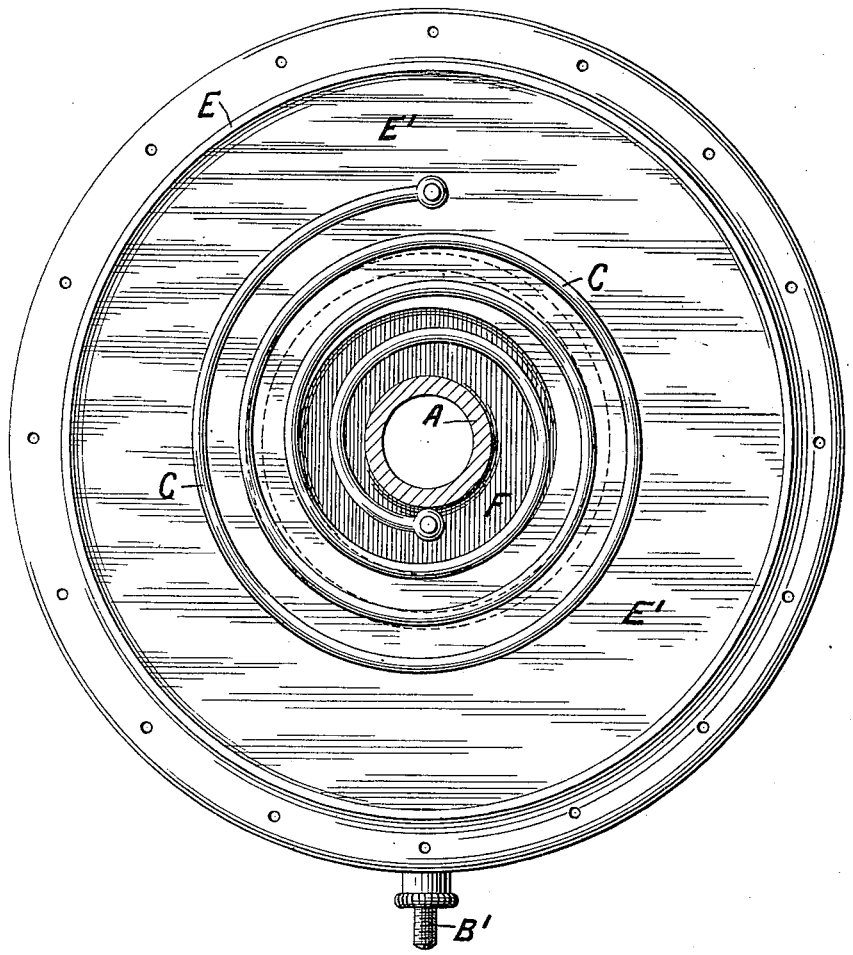

Figure 1 is a side view of an entire wheel fitted with a pneumatic hub according to this invention. Fig. 2 is a front view of same with the spokes and tire in section. Fig. 3 is an enlarged transverse section of hub, and Fig. 4 a side view of same with outside protecting-plate removed.

A illustrates the axle, and B a circular inflated tube. The hub consists of two main parts E and F. The part F is in the form of a drum fixed to or formed with the axle A, and the part E is an annular plate with two side webs E' E', which fit and overlap the sides of the drum F, so that the ring E may have motion upon the drum F and form the periphery of this annular plate E. The spokes of the wheel extend to the wheel-rim D.

Within the annular inclosed space between the ring E and the drum F the annular flexible air-tube B is located, which may be inflated by a valve B', extending through to the exterior of the ring E. Thus the ring E and with it the wheel-rim and tire D D' are distanced and elastically insulated from the axle A, while the axle may move resiliently relative to the ring E and the body of the wheel, according to the varying compressions of the annular tube B, which is entirely inclosed, as aforesaid.

In order to elastically control relative motions which may take place between the inner drum F and the outer ring E, I provide upon each side of these parts a spiral spring C. The outer ends of these springs are fixed to the inwardly-extending plates E' of the ring E, Fig. 4, and the inner ends of the springs C are fixed to the sides of the drum F, so that relative circumferential motions between these two parts are elastically controlled, although such may take place within limits, which while giving as a result all that can be desired in the way of resiliency to the wheel, yet prevent such undue movements as would be calculated to produce damage to the composing elements. The spiral springs C are covered by lateral plates G, which are entirely independent of the parts before mentioned, the said plates being carried from the axle and fitted with peripheral packing-rings G', which exclude dust from the springs C and from those parts which have relative motions upon one another.

Having now particularly described my said invention, what I desire to claim is—

1. In a pneumatic hub for wheels, the combination with an axle, of a cylindrical drum formed integral with said axle, an annular plate surrounding said drum but separated therefrom, an air-cushion located between said drum and annular plate, and a flexible connection between the said drum and annular plate, substantially as described.

2. In a pneumatic hub for wheels, the combination with an axle, of a cylindrical drum mounted on said axle, an annular plate circumferentially surrounding said drum and having inwardly-projecting side webs adapted to fit over the sides of said drum and partially inclose the same; an air-cushion located in the space formed between the said annular plate and drum, and a spiral spring adapted to flexibly connect the side webs of said annular plate with the said drum, substantially as described.

3. In a pneumatic hub for wheels the combination with an axle, of a cylindrical drum formed integral therewith, an annular plate having inwardly-projecting side webs adapted to fit over the sides of said drum and partially inclose the same, an air-cushion located between said annular plate and said drum, springs coiled spirally around said axle on each side of said cylindrical drum, secured at their outer ends to the side webs of said annular plate and at their inner ends to the sides of said drum, and casings having peripheral packing-rings in contact with the side webs of said annular plate, inclosing said spiral springs against the admission of dust and dirt to the said springs and the interior of said hub, substantially as described.

In testimony whereof I affix my signature in presence of two witnesses.

THEOPHILUS COAD.

Witnesses:
FREDERIC PRINCE,
CHARLES S. MOLE.